United States Patent Office 2,923,722
Patented Feb. 2, 1960

2,923,722
2-LOWER-ALKYL-9α-HALO-4-PREGNENES

John A. Hogg and Frank H. Lincoln, Jr., Kalamazoo Township, Kalamazoo County, Mich., assignors to The Upjohn Company, Kalamazoo, Mich., a corporation of Michigan No Drawing. Application May 23, 1955
Serial No. 510,518

15 Claims. (Cl. 260—397.45)

This invention relates to novel steroids, more particularly to synthetic steroid hormones, to novel steroid intermediates in the production of these synthetic steroids and the process for their production. This application is a continuation-in-part of our copending application S.N. 485,318, filed January 31, 1955.

The novel synthetic steroid hormones of this invention, i.e., 2 - lower - alkyl - 9α - halo - 11β,17α,21 - trihydroxy-4-pregnene-3,20-dione and 21-esters thereof, and 2 - lower - alkyl - 9α - halo - 17α,21 - dihydroxy - 4 - pregnene - 3,11,20 - trione and esters thereof especially the 2 - methyl - 9α - fluoro compounds, possess outstanding mineralocorticoid, glucocorticoid and anti-inflammatory activity. They are useful in the treatment of inflammations of the skin, eyes and ears of humans and valuable domestic animals due to contact dermatitis, allergic reactions or other physiological malfunctions and many bacterial and fungal infections. The 2-lower-alkyl-9α-halo - 11β,17α - dihydroxy - 21 - acyloxy - 4 - pregnene-3,20-diones of the present invention, and intermediates produced in a process for their production, may be represented by the following formulae:

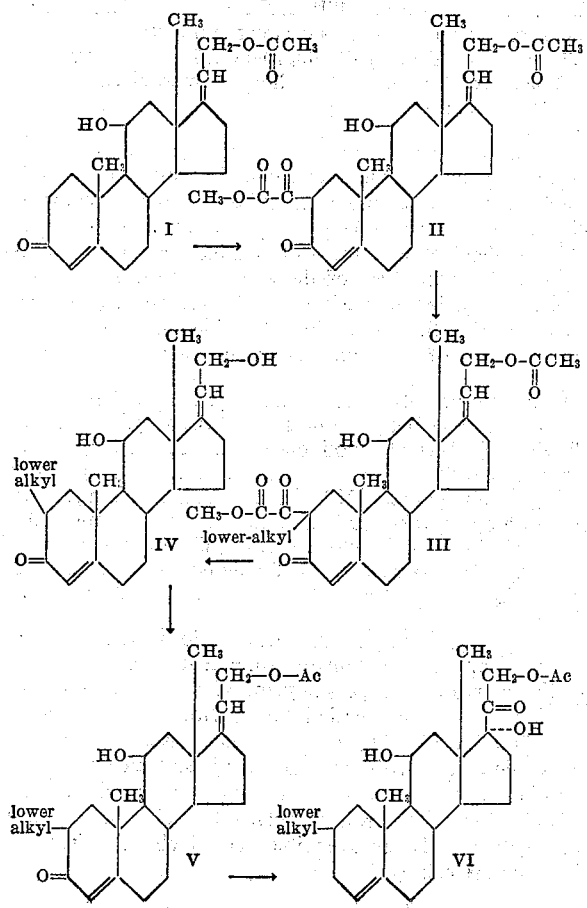

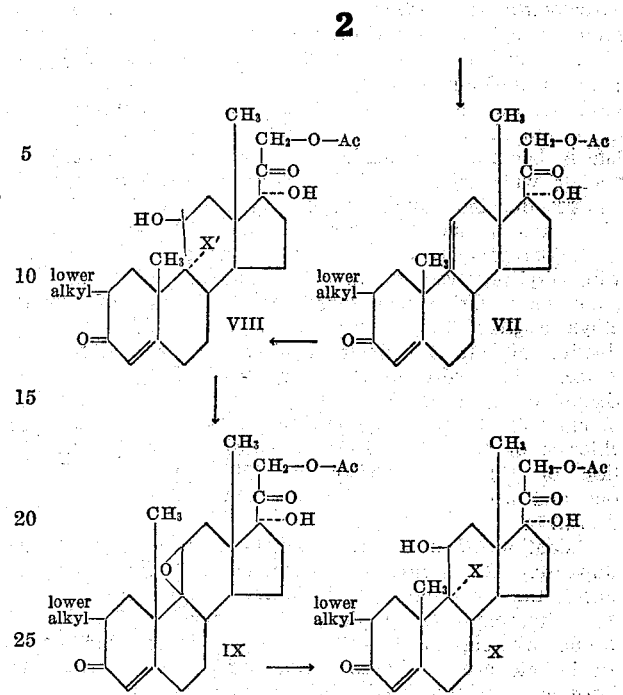

wherein Ac is the acyl radical of a hydrocarbon carboxylic acid containing from one to twelve carbon atoms, inclusive, and X is a halogen having an atomic weight from nineteen to 36, inclusive, i.e., chlorine or fluorine, and X' is a halogen having an atomic weight from 79 to 127, inclusive, i.e., bromine or iodine. In the formulae and specification, the term "lower-alkyl" means containing from one to eight carbon atoms, inclusive.

It is an object of the present invention to provide the synthetic corticosteroids 2 - lower - alkyl - 9α - halo-11β,17α,21 - trihydroxy - 4 - pregnene - 3,20 - dione and 21 - esters thereof and 2 - lower - alkyl - 9α - halo-17α,21 - dihydroxy - 4 - pregnene - 3,11,20 - trione and 21-esters thereof. Another object is the provision of steroid intermediates readily convertible to these synthetic steroid hormones. Still another object is the provision of a process for the production of these synthetic steroid hormones. Other objects will be apparent to those skilled in the art to which this invention pertains.

11β - hydroxy - 21 - acetoxy - 4,17(20) - pregnadiene-3-one (I) is converted to the novel synthetic hormones of the present invention by the following reactions: first, glyoxalation with dimethyl oxalate to produce a 2-methoxyoxalyl derivative (II); second, alkylation to produce the corresponding 2-lower-alkyl-2-methoxy-oxalyl compound (III); third, removal of the 2-carbonyl group to produce the 2-lower-alkyl compound (IV); fourth, esterification of the thus-produced 21-hydroxy compound to produce a 21-esterified compound (V); fifth, oxidative hydroxylation of the Δ$^{17(20)}$-double bond to produce a 2 - lower - alkyl - 11β,17α - dihydroxy - 21 - acyloxy-4-pregnene-3,20-dione (VI), as disclosed in our copending application S.N. 485,318, filed January 31, 1955; sixth, dehydration of the 11α-hydroxy group to produce the corresponding 9(11) - dehydro compound (VII); seventh, introduction of the bromohydrin group with hypobromous acid to produce the corresponding 9α-bromo-11β-hydroxy compound (VIII); eighth, converting the bromohydrin group to an oxido group to produce a 2 - lower - alkyl - 9:11 - β - oxido - 17α - hydroxy - 21 - acyloxy - 4 - pregnene - 3,20 - dione (IX); and ninth, opening the oxido group with hydrogen chloride or hydrogen fluoride to produce a 2-lower-alkyl-9α-halo - 11β,17α - dihydroxy - 21 - acyloxy - 4 - pregnene-3,20-dione (X) of the present invention. Hydrolysis of one of these esters, preferably the 21-acetate, is productive of the corresponding 21-lower-alkyl-9α-halo-11β,17α,21-trihydroxy-4-pregnene-3,20-dione (X, wherein the Ac group is replaced by a hydrogen atom).

The starting 11β - hydroxy - 21 - acetoxy - 4,17(20)- pregnadiene-3-one is prepared by reacting 11-ketoprogesterone with about a molar equivalent of sodium methoxide and about 2.75 molar equivalents of diethyl oxalate in benzene, brominating the thus produced sodium enolate with about two molar equivalents of bromine and reacting the brominated product with sodium methoxide and methanol to produce methyl 3,11-diketo-4,17(20)-pregnadiene-21-oate. Ketalizing the 3-keto group with ethylene glycol followed by reduction with lithium aluminum hydride and subsequent hydrolysis of the ethylene glycol ketal group with aqueous acid is productive of 11β,21 - dihydroxy - 4,17(20) - pregnadiene-3-one. 11β - hydroxy - 21 - acetoxy - 4,17(20) - pregnadiene-3-one is prepared by the reaction of the latter compound with the selected esterification agent, e.g., acetyl chloride or acetic anhydride in pyridine. The production of 11β,21 - dihydroxy - 4,17(20) - pregnadiene-3-one and 21-esters thereof is disclosed in U.S. Patent 2,774,776.

Oxidation of a 2 - lower - alkyl - 9α - halo - 11β,17α- dihydroxy - 21 - acetoxy - 4 - pregnene - 3,20 - dione produces the corresponding 2 - lower - alkyl - 9α - halo-17α - hydroxy - 21 - acyloxy - 4 - pregnene - 3,11,20-trione, wherein the 11β-hydroxy group is replaced by an 11-keto group. These steroids also possess cortical hormone activity markedly different from the corresponding esters of 17α,21 - dihydroxy - 4 - pregnene - 3,11,20 - trione. Especially outstanding among these compounds are 2 - methyl - 9α - fluoro - 17α,21 - dihydroxy-4-pregnene-3,11,20-trione and the 21-esters thereof wherein the ester group is lower-acyloxy and preferably acetoxy. These compounds possess a hormonal activity spectrum, e.g., mineralocorticoid, glucocorticoid and anti-inflammatory activity different from any of the natural or heretofore known synthetic adrenal cortical hormones. Their anti-inflammatory activity is of an especially high order of activity.

Substitution of another 2-lower-alkyl-11β,17α-dihydroxy-21-acyloxy-4-pregnene-3,20-dione as the starting steroid in the reactions described above is productive of the corresponding 2-lower-alkyl-9α-chloro or fluoro-11β,17α-dihydroxy-21-acyloxy-4-pregnene-3,20-dione.

The novel 2-lower-alkyl-9α-halo-11β,17α,21-trihydroxy-4-pregnene-3,20-dione and 21-esters thereof (X) have a high order of physiological activity, and possess different activity spectrum than the adrenal cortical hormone hydrocortisone. The novel synthetic cortical steroid hormones of the present invention possess anti-inflammatory, glucocorticoid, and mineralocorticoid activity of a high order. Their surprising pattern of physiological activity is exemplified by the fact that 2-methyl-9α-fluoro-11β,17α-dihydroxy-21-acetoxy-4-pregnene-3,20-dione has both pronounced mineralocorticoid and anti-inflammatory activity.

For example, the 2-methyl-9α-fluoro synthetic cortical hormone of the present invention has a glucocorticoid activity about twenty to thirty times as great and an anti-inflammatory activity, about 8.5 times as great as hydrocortisone and a mineralocorticoid activity about sixty times that of desoxycorticosterone acetate. The novel intermediates VII to IX also possess a useful glucocorticoid and anti-inflammatory activity.

The novel 2-lower-alkyl-9α-fluoro- and -9α-chloro-11β,17α,21-trihydroxy-4-pregnene-3,20-dione and 2-lower-alkyl-9α-fluoro- and -9α-chloro-11β,17α-dihydroxy-21-acyloxy-4-pregnene-3,20-diones of the present invention can be used orally, topically or parenterally. Oral compositions of the invention can be prepared and administered in the form of tablets, capsules, powders or liquid suspensions. Tablets for advantageous mucosal absorption can also be made using either polyethylene glycol 4000 or 6000 as the carrier or lactose and/or sucrose as the diluent.

The novel 2-lower-alkyl-9α,fluoro- and -9α-chloro-11β,17α,21-trihydroxy-4-pregnene-3,20 dione and 2-lower-alkyl-9α-fluoro- and -9α-chloro-11β,17α-dihydroxy-21-acyloxy-4-pregnene-3,20-diones of the present invention are especially useful as pharmaceutical compositions and mixtures, e.g., ointments, lotions, jellies, creams, aqueous suspensions, etc., for topical use. Examples of especially advantageous pharmaceutical compositions are listed below. Although the examples are to the 2-methyl-9α-fluoro - 11β,17α,21 - trihydroxy - 4 - pregnene - 3,20 - dione and 2-methyl-9α-fluoro-11β,17α-dihydroxy-21-acetoxy-4-pregnene-3,20-dione, it is to be understood that molar equivalent amounts of the other 2-lower-alkyl homologues and corresponding 9α-chloro analogues of the present invention and 21-esters thereof, respectfully, are substitutable therein.

The novel 2-methyl-9α-fluoro-11β,17α-dihydroxy-21-acetoxy-4-pregnene-3,20-dione is advantageously employed in a bland, non-irritating ointment base for use in the treatment of topical inflammatory conditions. A suitable dermatological and ophthalmic ointment has the following composition:

| | lbs. |
|---|---|
| 20 percent wool fat USP | 100 |
| 25 percent mineral oil USP | 125 |
| 0.1 percent 2-methyl-9α-fluoro-11β,17α-dihydroxy-21-acetoxy-4-pregnene-3,20-dione (micronized) | 0.5 |
| White petrolatum USP, q.s.-ad | 500 |

Incorporation of an antibiotic in the ointment, especially neomycin sulfate, has surprising therapeutic advantages each active ingredient potentiating and supplementing the useful properties of the other. Such an ointment is as follows:

| | lbs. |
|---|---|
| 20 percent wool fat USP | 100 |
| 25 percent mineral oil USP | 125 |
| 0.6 percent neomycin sulfate (microatomized) | 3 |
| 0.2 percent 2-methyl-9α-fluoro-11β,17α-dihydroxy-21-acetoxy-4-pregnene-3,20-dione (micronized) | 1 |
| White petrolatum USP, q.s.-ad | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlortetracycline, tetracycline, chloramphenicol and the sulfonamides can be used to enhance the usefulness of the above ointments.

An injectable composition suited for suspending the compounds of the present invention having advantages in the treatment of Addisonian crisis and shock is as follows:

| | |
|---|---|
| Sodium citrate USP | mg-- 5.7 |
| Sodium carboxymethylcellulose, low viscosity | mg-- 5.0 |
| Plasdone (polyvinylpyrrolidone) | mg-- 5.0 |
| Polysorbate 80, USP | mg-- 4.0 |
| Sterile methylparaben USP | mg-- 1.5 |
| Sterile propylparaben USP | mg-- 0.2 |
| 2 - methyl - 9α - fluoro - 11β,17α - dihydroxy - 21 - acetoxy - 4 - pregnene - 3,20 - dione | mg-- 5.0 |
| Water for injection, q.s.-ad | cc-- 1.0 |

The suspending agents in this vehicle, in this case the combination of polyvinylpyrrolidone-sodium carboxymethylcellulose or a polyalkylene glycol, as disclosed in our co-pending application Serial No. 471,512 and in U.S. Patent 2,897,120, are particularly useful when used in conjunction with the novel physiologically active steroids of the present invention make an especially good combination, they produce relatively stable suspensions which are readily resuspendible and which show freedom from undue caking.

Another composition suitable for injection has the following composition:

| | |
|---|---|
| Sterile micronized 2-methyl-9α-fluoro-11β,17α,21-trihydroxy-4-pregnene-3,20-dione_____grams__ | 0.3 |
| Polyethylene glycol 4000_____do____ | 3.0 |
| Sodium chloride USP_____do____ | 0.9 |
| Polysorbate 80 USP_____do____ | 0.4 |
| Benzyl alcohol N.F._____do____ | 0.9 |
| Water for injection q.s._____cc__ | 100 |

The polyethylene glycol, sodium chloride, Polysorbate 80 and benzyl alcohol are dissolved in water and the solution sterilized by filtration. Sterile 2-methyl-9α-fluoro-11β,17α,21-trihydroxy-4-pregnene-3,20-dione is then aseptically mixed with the sterile vehicle and the whole homogenized.

The following examples are illustrative of the process and products of the present invention, but are not to be construed as limiting.

EXAMPLE 1

2-methyl-17α-hydroxy-21-acetoxy-4,9(11)-pregnadiene-3,20-dione (VII)

A mixture of one gram (2.38 millimoles) of 2-methyl-11β,17α-dihydroxy-21-acetoxy-4-pregnene-3,20-dione, 662 milligrams (two equivalents) of N-bromoacetamide and six milliliters of pyridine was stirred in the dark for thirty minutes. The mixture was cooled in an ice-water bath and a stream of sulfur dioxide was directed onto the surface of the stirred mixture until a negative KI-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained 0.82 gram, a yield of 85 percent of the theoretical, of 2-methyl-17α-hydroxy-21-acetoxy-4,9(11)-pregnadiene-3,20-dione as colorless needles melting at 212 to 217 degrees centigrade. A sample recrystallized from a mixture of acetone and methylene chloride melted at 220 to 223 degrees centigrade, had an $[\alpha]_D$ of plus 138 degrees in chloroform, an infrared absorption spectrum consistent with the structure, and the analysis below.

Calculated for $C_{24}H_{32}O_5$: C, 71.97; H, 8.05. Found: C, 72.05; H, 8.32.

Following the procedure described in Example 1, but substituting another 21-ester of a 2-lower alkyl-11β,17α,21-trihydroxy-4-pregnene-3,20-dione, e.g., an ester disclosed in our copending application S.N. 485,318, especially the 2-methyl-11β,17α-dihydroxy-21-acyloxy-4-pregnene-3,20-diones wherein the acyl radical is that of a hydrocarbon carboxylic acid containing from one to twelve carbon atoms, inclusive, as the starting steroid in the reaction, there are produced other 21-esters of 2-methyl-17α,21-dihydroxy-4,9(11)-pregnadiene-3,20-dione and 2-lower-alkyl homologues thereof.

EXAMPLE 2

2-methyl-9α-bromo-11β,17α-dihydroxy-21-acetoxy-4-pregnene-3,20-dione (VIII)

To a stirred solution of 0.50 gram (1.24 millimole) of 2-methyl-17α-hydroxy-21-acetoxy-4,9(11)-pregnadiene-3,20-dione in twenty milliliters of methylene chloride was added a solution of one milliliter of 71 percent perchloric acid, in ten milliliters of water, and 206 milligrams (1.49 millimole) of N-bromoacetamide in fifty milliliters of tertiary butyl alcohol. The solution was maintained at room temperature for fifteen minutes and then mixed with a solution of 0.25 gram of sodium sulfite in twelve milliliters of water. The mixture was distilled at reduced pressure until the residual solution became cloudy. The product was then precipitated therefrom by the addition of 100 milliliters of a mixture of ice and water. The white, crystalline precipitate of 2-methyl-9α-bromo-11β,17α-dihydroxy-21-acetoxy-4-pregnene-3,20-dione was filtered, washed with water and then dried at room temperature under vacuum. The dry product weighed 0.57 gram, a yield of 92.2 percent of the theoretical, and melted at 125 to 130 degrees centigrade. A sample recrystallized from a mixture of acetone and Skellysolve B hexane hydrocarbons melted at 128 to 131 degrees centigrade and had the analysis below.

Calculated for $C_{24}H_{33}BrO_6$: Br, 16.07. Found: Br, 16.27; 16.06.

Following the procedure described in Example 2, but substituting another 21-ester of a 2-lower-alkyl-17α,21-dihydroxy-4,9(11)-pregnadiene-3,20-dione, e.g., a 2-methyl-17α-hydroxy-21-acyloxy-4,9(11)-pregnadiene-3,20-dione wherein the acyl radical is that of a carboxylic acid named in the paragraph following Example 5, especially those of hydrocarbon carboxylic acids containing from one to twelve carbon atoms, inclusive, as the starting steroid in the reaction, there are produced other 21-esters of 2-methyl-9α-bromo-11β,17α,21-trihydroxy-4-pregnene-3,20-dione and 2-lower-alkyl homologues thereof.

EXAMPLE 3

2-methyl-9:11-β-oxido-17α-hydroxy-21-acetoxy-4-pregnene-3,20-dione (IX)

A mixture of 0.47 gram (0.95 millimole) of 2-methyl-9α-bromo-11β,17α-dihydroxy-21-acetoxy-4-pregnene-3,20-dione, 0.47 gram of anhydrous potassium acetate and twenty milliliters of acetone was heated at its refluxing temperature for five hours. The cooled mixture was poured into water and then extracted with methylene chloride. The methylene chloride extract was dried and then poured over a column of 25 grams of Florisil synthetic magnesium silicate. The column was developed with Skellysolve B hexane hydrocarbons containing increasing proportions of acetone. The Skellysolve B plus ten percent acetone eluates contained 0.29 gram, a yield of 75 percent of the theoretical, of 2-methyl-9:11-β-oxido-17α-hydroxy-21-acetoxy-4-pregnene-3,20-dione which, when recrystallized from a mixture of acetone and Skellysolve B, was obtained as colorless plates melting at 185 to 188 degrees centigrade, having an $[\alpha]_D$ of plus 49 degrees in chloroform, and having the analysis below.

Calculated for $C_{24}H_{32}O_6$: C, 69.20; H, 7.75. Found: C, 69.28; H, 7.90.

Following the procedure described in Example 3, but substituting another 21-ester of a 2-lower-alkyl-9α-bromo-11β,17α,21-trihydroxy-4-pregnene-3,20-dione, e.g., a 2-methyl-9α-bromo-11β,17α-dihydroxy-21-acyloxy-4-pregnene-3,20-dione wherein the acyl radical is that of a carboxylic acid named in the paragraph following Example 5, especially those of hydrocarbon carboxylic acid containing from one to twelve carbon atoms, inclusive, as the starting steroid in the reaction, there are produced other 21-esters of 2-methyl-9:11-β-oxido-17α,21-dihydroxy-4-pregnene-3,20-dione and 2-lower-alkyl homologues thereof.

EXAMPLE 4

2-methyl-9α-fluoro-11β,17α-dihydroxy-21-acetoxy-4-pregnene-3,20-dione (X)

A solution of 1.07 grams (2.57 millimoles) of 2-methyl-9:11-β-oxido-17α-hydroxy-21-acetoxy-4-pregnene-3,20-dione in 150 milliliters of methylene chloride was concentrated to a volume of fifty milliliters by distillation. To the concentrated solution at room temperature was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate and then poured over a column of 100 grams of Florisil synthetic magnesium silicate. The column was developed with 200 milliliter portions of Skellysolve B plus ten percent acetone. The eighth through sixteenth eluate fractions contained 0.61 gram of 2-methyl-9α-fluoro-11β,17α-dihydroxy-21-acetoxy-4-pregnene-3,20-dione which after crystallization from a mixture of acetone and Skellysolve B melted at 218 to 222 degrees centigrade with decomposition. A portion recrystallized from the same solvent melted at 225 to 228 degrees centigrade with decomposition, had an $[\alpha]_D$ of plus 156 degrees in dioxane, a $\lambda_{max}^{alcohol}$ of 239

E 15,850, and the analysis below:

Calculated for $C_{24}H_{33}FO_6$: C, 66.03; H, 7.62; F, 4.35. Found: C, 65.62; H, 7.54; F, 3.87.

Following the procedure described in Example 4, but substituting another 21-ester of a 2-lower-alkyl-9:11-β-oxido-17α,21-dihydroxy-4-pregnene-3,20-dione, e.g., a 2-methyl - 9:11 - β-oxido-17α - hydroxy-21 - acyloxy-4-pregnene-3,20-dione wherein the acyl radical is that of an organic carboxylic acid named in the paragraph following Example 5, especially those of a hydrocarbon carboxylic acid containing from one to twelve carbon atoms, inclusive, as the starting steroid in the reaction, there are produced other 21-esters of 2-methyl-9α-fluoro-11β,17α,21-trihydroxy-4-pregnene-3,20-dione and 2-lower-alkyl homologues thereof.

Following the procedure described in Example 4, but substituting a molar equivalent amount of hydrogen chloride for the hydrogen fluoride used therein, produces 2-methyl-9α-chloro-11β,17α - dihydroxy-21 - acetoxy-4-pregnene-3,20-dione. Substituting another 2-methyl-9:11-β-oxido-17α-hydroxy-21 - acyloxy-4 - pregnene - 3,20-dione, e.g., one named above, in the reaction with hydrogen chloride is productive of other 2-methyl-9α-chloro-11β,17α-dihydroxy-21-acyloxy-4-pregnene-3,20-diones.

EXAMPLE 5

*2-methyl-9α-fluoro - 11β,17α,21 - trihydroxy - 4-pregnene-3,20-dione*

A solution of 437 milligrams of 2-methyl-9α-fluoro-11β,17α-dihydroxy - 21-acetoxy-4 - pregnene-3,20-dione is freed of oxygen by bubbling nitrogen therethrough. A solution of 404 milligrams of potassium bicarbonate in four milliliters of water is similarly freed of oxygen. The two solutions are mixed at a temperature between eighteen and twenty degrees centigrade in a nitrogen atmosphere. The mixture is stirred at room temperature for five hours while protecting it from atmospheric oxygen with nitrogen. At the end of this time the solution is neutralized with glacial acetic acid. The neutral solution is concentrated by distillation at room temperature and reduced pressure and then chilled in a refrigerator for sixteen hours. The precipitated 2-methyl-9α-fluoro-11β,17α,21-trihydroxy-4-pregnene-3,20-dione is filtered and dried.

2-methyl-9α-fluoro-11β,17α,21-trihydroxy - 4-pregnene-3,20-dione is converted to other 2-methyl-9α-fluoro-11β,17α - dihydroxy-21 - acyloxy-4 - pregnene-3,20 - diones by esterification of the 21-hydroxy group, e.g., by reaction with the appropriate acid anhydride, acid chloride or bromide, ester by ester exchange, acid in the presence of an esterification catalyst, etc. Examples of 2-methyl-9α-fluoro - 11β,17α - dihydroxy - 21-acyloxy - 4-pregnene-3,20-dione prepared include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts) e.g., succinic, glutaric, α-methylglutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicyclic, an aminoacid, e.g., glycine, diglycolamic, triglycolamic, methylglycine, dimethylglycine, diethylglycine, para-aminosalicyclic, para-aminobenzoic, other heterosubstituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

Alternatively, the 21-hydroxy group of the 2-methyl-11β,17α,21-trihydroxy-4,17(20)-pregnadiene-3-one can be converted to another 21-derivative, leaving the remainder of the molecule unchanged. Examples of such 21-derivatives are 21-ethers, e.g., 21-methoxy, ethoxy, benzyloxy, propoxy, α - tetrahydropyranyloxy, (β - carbethoxy - β - cyano)ethylenoxy, β,β-dicarbethoxyethenyloxy, β-ketocyclohexenyloxy, β-trichloro-α-acetylethoxy, chloromethoxy, dimethylmethoxy, diethylmethoxy, dimethylethoxy, diethylethoxy, 21-thioesters, e.g., acetylmercapto, β-cyclopentylpropionylmercapto, triethylacetylmercapto, trimethylacetylmercapto, propionylmercapto, 21 - thione esters, e.g., thioacetyloxy, thiopropionyloxy, thio-β-cyclopentylpropionyloxy, thiotriethylacetyloxy, thiotrimethylacetyloxy, imido derivatives of acetyl esters, e.g., acetimido-oxy, 21-esters of mineral acids, e.g., 21-phosphate, 21-sulfonate, 21-sulfinate, 21-methylphosphate, 21-methylsulfonate, 21-methylsulfinate, 21-bromo, fluoro and 21-chloro, esters of the carbonic acids, e.g., 21-carbonate, 21-(triethoxy)methoxy, 21-sulfonyloxy, e.g., 21-paratoluenesulfonyloxy, etc.

Following the procedure of Example 5, but substituting 2-methyl-9α-chloro-11β,17α-dihydroxy-21-acetoxy-4-pregnene-3,20-dione as the starting steroid, there is thus produced 2-methyl - 9α-chloro - 11β,17α,21 - trihydroxy-4-pregnene-3,20-dione.

EXAMPLE 6

*2-methyl-9α-fluoro-17α-hydroxy-21-acetoxy - 4-pregnene-3,11,20-trione*

To a stirred solution of 174 milligrams (0.004 mole) of 2-methyl-9α fluoro-11β,17α-dihydroxy-21-acetoxy-4-pregnene-3,20-dione dissolved in 11.9 milliliters of glacial acetic acid and thereafter cooled to fourteen degrees centigrade is added dropwise, over a period of twenty minutes, a solution of 0.55 gram of chromium trioxide dissolved in 1.1 milliliters of glacial acetic acid and 1.1 milliliters of water. The temperature of the stirred solution is thereafter allowed to rise to eighteen degrees centigrade over a period of one hour. The excess chromium trioxide is destroyed by the addition of an aqueous sodium sulfite solution, and the product then extracted from the reaction mixture with three fifteen-milliliter portions of ether which are thereafter combined, washed with water, and dried over anhydrous sodium sulfite. The ether is then removed by evaporation. The residue consists essentially of 2-methyl-9α-fluoro-17α-hydroxy-21-acetoxy-4-pregnene-3,11,20-trione, which is purified by chromatographing over a column of ten grams of Florisil synthetic magnesium silicate. Developing the column with Skellysolve B hexane hydrocarbons containing increasing proportions of acetone elutes essentially pure 2-methyl-9α-fluoro-17α-hydroxy-21-acetoxy-4-pregnene-3,11,20-trione from the column.

Similarly, other 21-organic carboxylic acid esters of 2 - lower-alkyl-9α-fluoro-17α-hydroxy-21-acyloxy-4-pregnene-3,11,20-trione, preferably wherein the lower-alkyl group is methyl, are prepared by oxidation of the corresponding ester of 2-lower-alkyl-9α-fluoro-17α,21-dihydroxy-4-pregnene-3,20-dione, preferably the esters named in the paragraph following Example 5, especially those wherein the acyl radical is that of a hydrocarbon carboxylic acid containing from one to twelve carbon atoms, inclusive. Substituting the corresponding 9α-chloro compounds, preferably 2-methyl-9α-chloro-11β,17α-dihydroxy-21-acetoxy-4-pregnene-3,20-dione, as the starting steroid in the reaction described above, is productive of the corresponding 9α-chloro-11-keto compounds, preferably 2-methyl-9α-chloro-17α-hydroxy-21-acetoxy-4-pregnene-3,11,20-trione.

The examples hereinbefore describe the preparation of 2-methyl-9α-fluoro-11β,17α,21-trihydroxy - 4 - pregnene-3,20-dione, 2-methyl - 9α - chloro-11β,17α,21-trihydroxy-4-pregnene-3,20-dione and 21-esters and other 21-derivatives thereof and the corresponding 11-keto analogues thereof. Substitution of another 2-lower-alkyl-11β,17α-dihydroxy-21-acyloxy-4-pregnene-3,20-dione, e.g., those disclosed in our copending application 485,318, as the starting steroid in Examples 1, or substituting 2-lower-alkyl homologues of the 2-methyl steroids employed as the starting steroids in Examples 2 to 5, is productive of other 2-lower-alkyl - 9α - fluoro-11β,17α,21-trihydroxy-4-pregnene-3,20-diones, 2-lower-alkyl-9α-chloro-11β,17α,21-trihydroxy-4-pregnene-3,20-diones and 21-esters thereof wherein the lower-alkyl group is, for example, ethyl, propyl, butyl, amyl, hexyl, heptyl, or octyl. These compounds are oxidized in the manner disclosed in Example 6, to the corresponding 11-keto compounds.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2-lower-alkyl-9α-halo-11β,17α,21-trihydroxy-4-pregnene-3,20-dione and 21-esters thereof represented by the following formula:

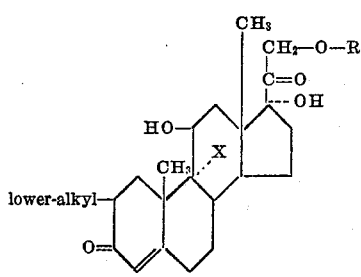

wherein X is a halogen having an atomic weight from nineteen to 80, inclusive and R is selected from the group consisting of hydrogen and the acyl radical of a carboxylic acid containing from one to twelve carbon atoms, inclusive.

2. 2-lower-alkyl-9α-halo-11β,17α-dihydroxy - 21 - acyloxy-4-pregnene-3,20-dione represented by the following formula:

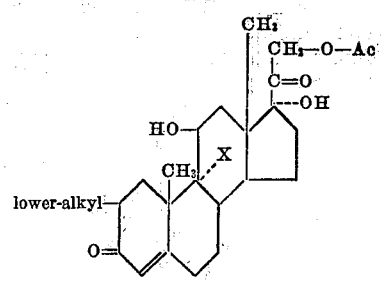

wherein X is a halogen having an atomic weight from nineteen to 36, inclusive, and Ac is the acyl radical of carboxylic acid containing from one to twelve carbon atoms, inclusive.

3. 2-methyl-9α-halo-11β,17α-dihydroxy-21-acyloxy - 4-pregnene-3,20 dione represented by the following formula:

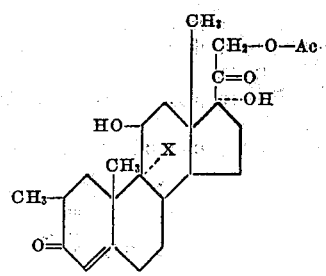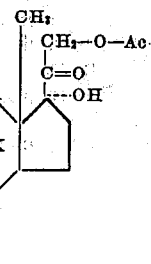

wherein X is a halogen having an atomic weight from nineteen to 36, inclusive, and Ac is the acyl radical of a hydrocarbon carboxylic acid containing from one to twelve carbon atoms, inclusive.

4. 2-methyl-9α-fluoro-11β,17α-dihydroxy-21-acetoxy-4-pregnene-3,20-dione.

5. 2-lower-alkyl-9α-hallo-11β,17α,21-trihydroxy-4-pregnene-3,20-dione represented by the following formula:

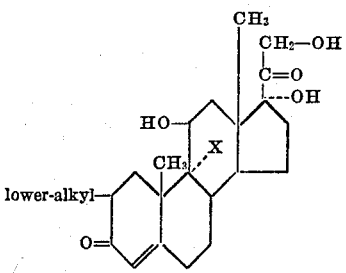

wherein X is a halogen having an atomic weight from nineteen to 36, inclusive.

6. 2-methyl-9α-halo-11β,17α,21-trihydroxy-4-pregnene-3,20-dione wherein the halogen has an atomic weight from nineteen to 36, inclusive.

7. 2-methyl-9α-fluoro-11β,17α,21-trihydroxy - 4 - pregnene-3,20-dione.

8. 2-lower-alkyl-9α-halo-17α-hydroxy-21-oxy - 4 - pregnene-3,11,20-trione represented by the following formula:

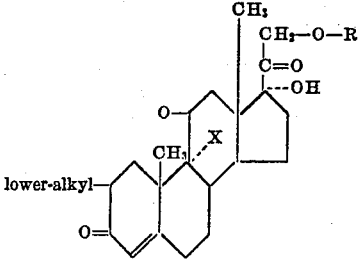

wherein X is a halogen having an atomic weight from nineteen to 36, inclusive, and R is selected from the group consisting of hydrogen and the acyl radical of a hydrocarbon carboxylic acid containing from one to twelve carbons, inclusive.

9. 2-methyl-9α-halo-17α-hydroxy-21-acyloxy - 4 - pregnene-3,11,20-trione represented by the following formula:

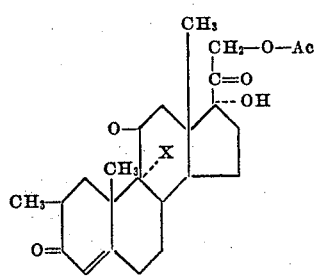

wherein X is a halogen having an atomic weight from nineteen to 36, inclusive, and Ac is the acyl radical of a hydrocarbon carboxylic acid containing from one to twelve carbon atoms, inclusive.

10. 2-lower-alkyl-9α-fluoro-17α-hydroxy-21-acetoxy-4-pregnene-3,11,20-trione.

11. 2-methyl-9α-fluoro-17α-hydroxy-21-acetoxy-4-pregnene-3,11,20-trione.

12. A compound represented by the formula:

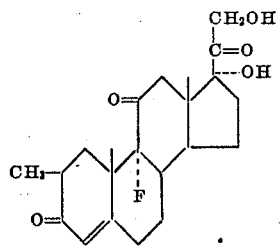

13. 2 - methyl - 9α - chloro - 11β,17α - dihydroxy - 21-acetoxy-4-pregnene-3,20-dione.

14. 2-methyl-9α-chloro-11β,17α,21-trihydroxy-4 - pregnene-3,20-dione.

15. 2-methyl-9α-fluoro-11β,17α-dihydroxy - 21 - succinoxy-4-pregnene-3,20-dione, sodium salt represented by the following formula:

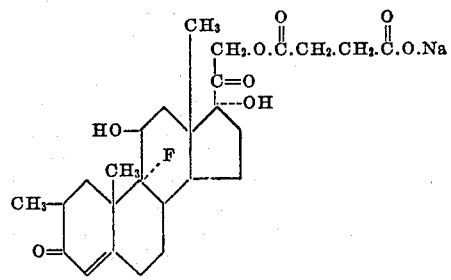

References Cited in the file of this patent
UNITED STATES PATENTS

| | | |
|---|---|---|
| 2,503,842 | Reichstein | Apr. 11, 1950 |
| 2,730,525 | Hogg et al. | Jan. 10, 1956 |
| 2,759,929 | Farrar et al. | Aug. 21, 1956 |
| 2,763,671 | Fried et al. | Sept. 18, 1956 |
| 2,779,775 | Sarett | Jan. 29, 1957 |
| 2,790,814 | Hogg et al. | Apr. 30, 1957 |
| 2,852,511 | Fried | Sept. 16, 1958 |

OTHER REFERENCES

J.A.C.S., vol. 75, pages 2273–4 (1953).
J.A.C.S., vol 76, page 1455 (1954)
Experientia, vol. XII, No. 9, pages 325–331 (1956).

UNITED STATES PATENT OFFICE
Certificate of Correction

Patent No. 2,923,722                        February 2, 1960

John A. Hogg et al.

It is hereby certified that error appears in the printed specification of the above numbered patent requiring correction and that the said Letters Patent should read as corrected below.

Column 1, lines 69 to 72, Formula VI, the lower left-hand portion of the formula should appear as shown below instead of as in the patent:

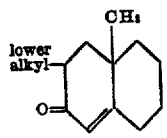

column 2, line 61, for "11α-hydroxy" read —11β-hydroxy—; column 9, line 31, for "Examples 1" read —Example 1—; column 10, line 38, claim 5, for "9α-hallo" read —9α-halo—; lines 61 to 69, claim 8, the upper right-hand portion of the formula should appear as shown below instead of as in the patent:

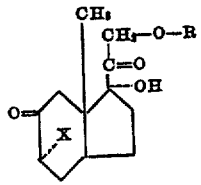

column 11, lines 6 to 14, claim 9, the upper right-hand portion of the formula should appear as shown below instead of as in the patent:

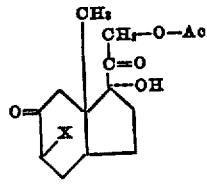

Signed and sealed this 9th day of August 1960.

[SEAL]

Attest:
KARL H. AXLINE,
*Attesting Officer.*

ROBERT C. WATSON,
*Commissioner of Patents.*